June 14, 1960
J. W. LUCAS
2,941,079
SAFETY VAULT APPARATUS
Filed Jan. 28, 1957
2 Sheets-Sheet 1
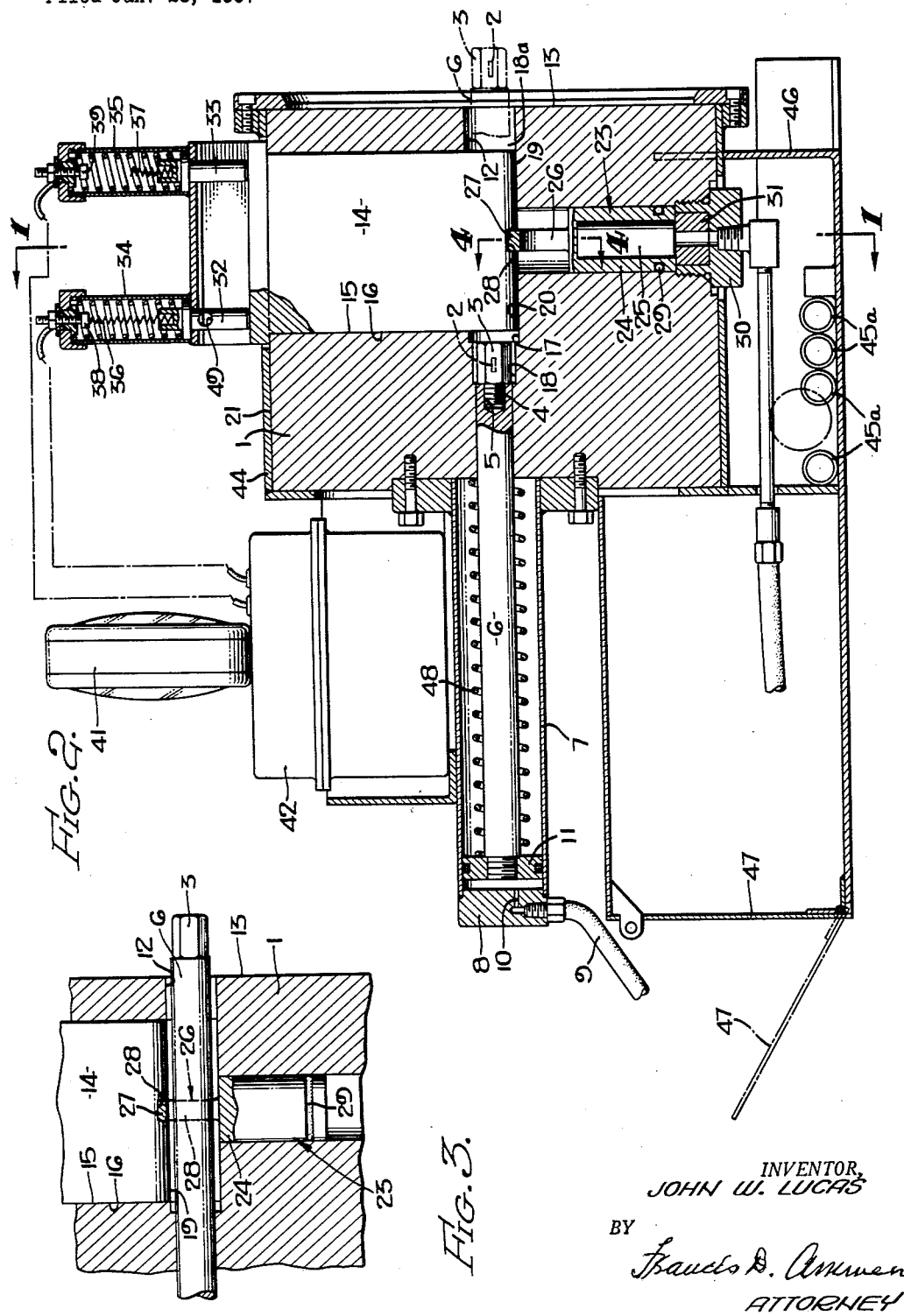
INVENTOR,
JOHN W. LUCAS
BY
Francis D. Ammen
ATTORNEY June 14, 1960        J. W. LUCAS        2,941,079
SAFETY VAULT APPARATUS
Filed Jan. 28, 1957        2 Sheets-Sheet 2
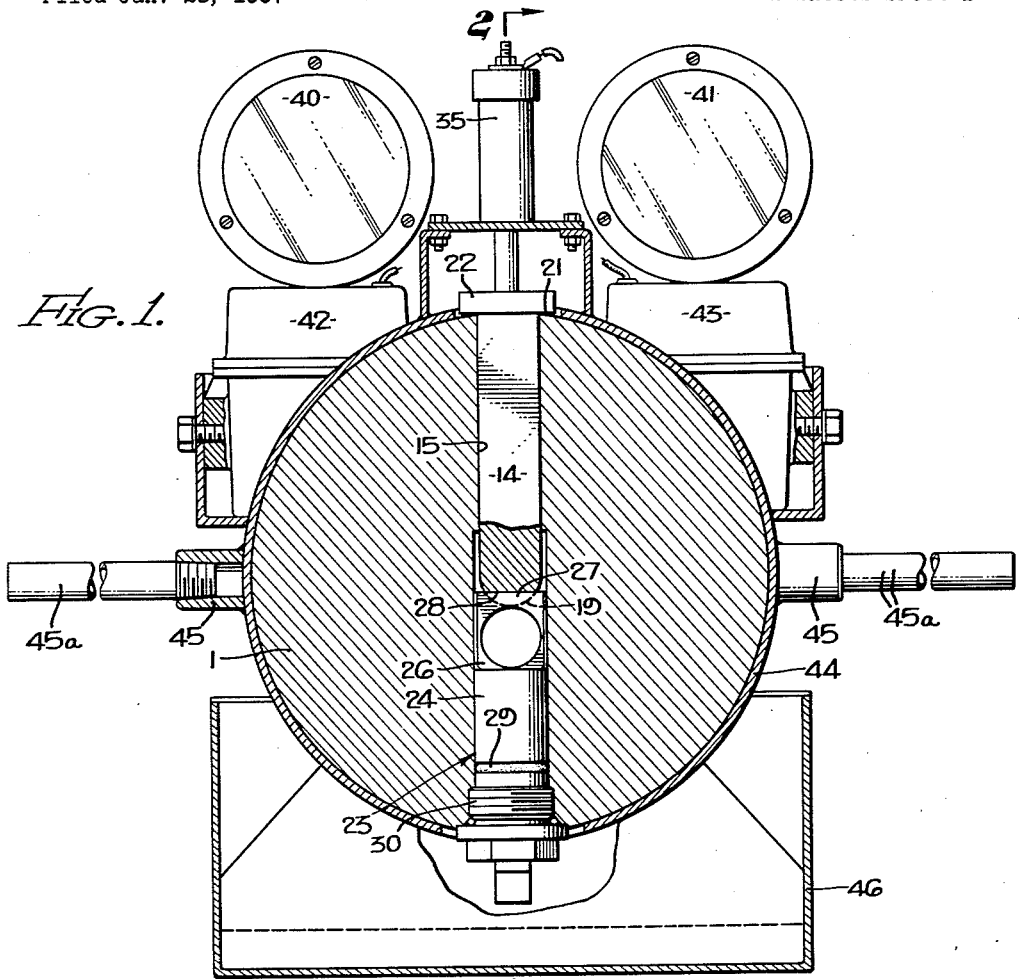
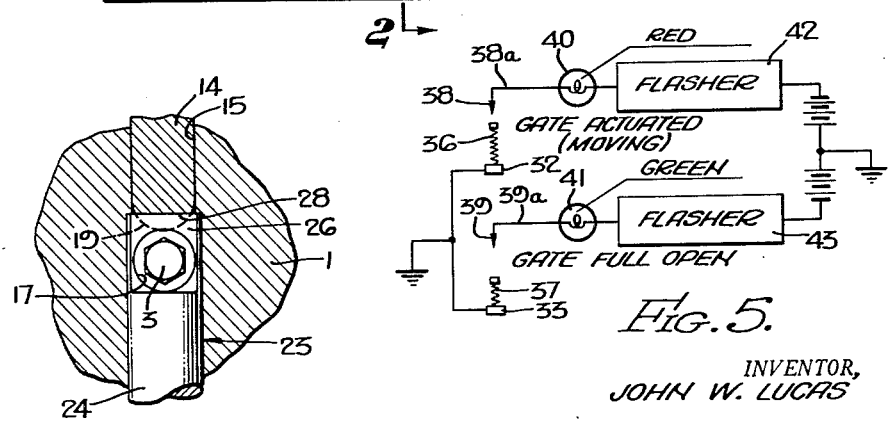
INVENTOR,
JOHN W. LUCAS
BY Francis D. Ammen
ATTORNEY United States Patent Office 2,941,079
Patented June 14, 1960

2,941,079

SAFETY VAULT APPARATUS

John W. Lucas, San Marino, Calif., assignor, by mesne assignments, to Yuba Consolidated Industries, Inc., San Francisco, Calif.

Filed Jan. 28, 1957, Ser. No. 636,717

7 Claims. (Cl. 250—106)

It is the present practice to employ any one of the radio-active substances, for example radium, or cobalt, for testing metals or other substances as to their molecular or physical structure. In this way flaws in the metals being tested can be indicated on plates exposed to the transmitted rays after the same have passed through the materials; in other words, producing negatives corresponding to X-ray plates used in therapeutics.

The apparatus about to be described has a construction particularly adapted for boxing and shipping; and is intended to be used especially in testing steel plates, large or heavy castings not amenable to testing by the application of X-rays. In fact it can be used also to detect faulty welds, and to find the evidence of flaws or other defects that may be seen on sensitized plates that have been affected by transmitted rays from a radio-active material such as radium, or other radio-active materials, for example, cobalt. It is essential that a radio-active substance being transported in a vault or casing should have thick walls impermeable to the rays from the radio-active substance, in accordance with the regulations of the Interstate Commerce Commission.

It is a well known fact that the human body may be injuriously affected from contact with rays emanating from such radio-active substances. For this reason it is necessary in a vault constructed to be used as a shipping case for a radio-active substance, to provide walls of lead of at least seven inches in thickness in order to be certain that they will be sufficiently impermeable to the passage of rays from radio-active substances.

One of the objects of this invention is to provide a simple protective vault to which a radio-active substance such as cobalt can be readily transferred, and held there in safety, to persons standing near it, that is, near the vault; and in addition to providing such a receiving vault with safely thick walls, a further object is to provide the receiving vault with accessory means for enabling the radio-active substance to function in performing the useful service for which it is intended, the passing of the rays through a material to affect a sensitized plate in a test.

Another object of the invention is to provide means whereby, when desired an unobstructed path may be established to the exterior of the casing, so that the rays passing to the exterior through an outlet may be used for affecting plates that are sensitive to the rays, for testing to discover flaws in metallic objects as outlined above.

Another object of this invention is to provide means associated with this lead vault or casing, that can be operated and controlled through the agency of air hose and a signal system to enable the radio-active substance to be advanced from its isolated position within the casing, and projected through an outlet from the casing to a point where it can be held stationary. This enables the rays to emanate laterally from the radio-active substance in a zone located radially from the location of the radio-active substance.

In that case, if the radio-active substance is held on the axis of a pipe, and any cylindrical object, or, for example, within an industrial steam boiler, plates sensitive to the rays may be held in a position encircling the boiler, or other object, which when developed, can give evidence to the condition of a complete belt or zone of any object or the boiler's wall.

Further objects of the invention will be evident from a careful reading of this specification and a study of the accompanying drawing.

The invention consists in the novel parts and combinations of parts to be described hereinafter, all of which contribute to produce an efficient safety vault apparatus.

A preferred embodiment of the invention is described in the following specification, while the broad scope of the invention is pointed out in the appended claims.

In the drawing:

Figure 1 is a vertical cross-section taken in the plane of the line 1—1 of Figure 2 of this drawing.

Figure 2 is a vertical section taken in the plane of the line 2—2 of Figure 1, certain parts being broken away and others shown partially in section to more fully illustrate the details.

Figure 3 is a fragmentary view in section showing the shaft of resistant material (lead) that is located behind the container for the radio-active substance, which the shaft carries. This view shows the shaft in its extended position in which it holds the radio-active substance completely outside of the protective lead casing to enable rays from it to emanate laterally as indicated by the arrows near its container.

Figure 4 is a fragmentary vertical section taken approximately in the plane of the broken line 4—4 of Figure 2.

Figure 5 is a diagrammatic view illustrating the automatic signalling circuit that indicates to the operator the condition of the path from the radio-active substance to the outlet from the casing.

In practicing the invention I provide a block form vault comprising a unitary block 1 which may be of cylindrical form (see Figure 1), and composed of lead or other suitable material that is highly resistant to the passage of rays from a radio-active substance 2 such as cobalt embodied in a capsule or "pill" held in a container 3.

The distinctive term "unitary block" used in the paragraph just preceding is used advisedly, because it is one of the features that distinguishes the construction of this vault from such vaults in the prior art.

This container is usually in the form of a hollow "hex" nut in which the pill is furnished to complete this apparatus.

As shown in Figure 2, the nut form container 3 usually has an integral threaded stud 4 at its end, that enables the nut to be attached to a threaded socket 5 in the forward end of a shaft 6. This shaft 6 is also of lead to resist emanation of rays toward the outer end of a fluid-operated cylinder 7. The head 8 of this cylinder is supplied with operating fluid which is delivered through the hose 9 from a valve, not shown. Ports 10 in the head 8 deliver the fluid under pressure into the outer end of the cylinder 7 to move the piston 11 carrying the lead rod 6, forwardly and toward an outlet 12 in the opposite outer face 13 of the casing.

When the radioactive substance has been advanced along the tunnel and through the outer face 13 of the casing, which face is located in a plane disposed at right angles to the axis of the tunnel, the rays from it can pass in all directions unobstructedly in a plane just beyond this face.

However, in the normal position of the parts, a gate 14 in the form of a slab constituting part of a gate assembly is movably mounted in a recess or guideway 15 in the casing 1, with its side edge 16 normally closing the forward, or mouth portion 17 of a "rest-chamber" 18 in which the pill container is located. This slab of this gate 14 is of sufficient thickness to completely close the mouth 17 of the rest-chamber 18, and the lower edge 19 of the gate rests against the bottom face 20 of the guide opening 18 for the gate, which extends into the casing block 1 from its upper face 21. In this closed position of the gate the underside of its terminal flange 22 at its upper end rests on the upper face 21 of the casing 1.

With this construction it is evident that if the gate 14 were raised sufficiently from its closed position as shown in Figure 1, a clear unobstructed path would be presented for passage of the rays from the radioactive substance 2, through a tunnel 18a the outlet 12, and such rays are to be used in practice to pass through any object such as a metal plate or other article so as to affect a plate sensitive to such rays which afterward is developed in the well known manner to enable the developed plate to give evidence of the molecular or physical condition of the article being tested.

In order to move the gate to its open position so as to form a tunnel 18a under the open gate and clear the path for the rays from the pill 2, a pusher 23 is provided, forming part of the gate assembly, and including a cylindrical bonnet 24 fitting over a lead core 25.

The upper end of the bonnet 24 has an extension integral with it in the form of a rectangular yoke 26 which at its upper edge has a transverse extension 27 which is received in an angular notch 28 cut into the lower edge portion of the gate. If desired, the lower end of the gate may be convex to a short radius.

The presence of the notch is desirable because it maintains the yoke 26 in its proper plane to present its central opening 28 in perfect alignment with the path through the tunnel 18a for the rays to pass forward and through the outlet 12.

The apparatus may be set for exposing test plates in a circumferential zone, by having the radio-active substance projected bodily out through the outlet 12 as indicated in Figure 3 where the shaft 6 is shown extended through the opening 28. In this position the rays can emanate unobstructedly in a plane about perpendicular to the axis of the shaft 6 and the tunnel 18a.

Near the butt end of the pusher bonnet 24 a circumferential groove is provided that receives an O-ring 29 for sealing the fluid such as air under pressure that is admitted through a screw-plug 30 and a ported insert 31 of lead, so applied with compressed air through an elbow 31a from a flexible hose 31b.

Means are provided for signaling by means of an indicator to the attendant operating the apparatus whether the gate 14 is in the act of opening, and also indicating when the gate has arrived in the open position.

For this purpose it is preferable to provide two contact plungers 32 and 33, carried in their own tubular housings 34 and 35. Inside the housings spring-type contacts 36 and 37 are provided that are spaced by different distances from fixed contacts 38 and 39 that are parallel branch circuits 38a and 39a to flashing lamps 40 and 41 that show red and green respectively.

These branch circuits include circuit breakers 42 and 43 to develop the flashing effect. The casing may be of cylindrical form (see Figure 1) jacketed in a conforming metal housing 44 provided with four threaded sockets 45 to receive handles in the form of short bars 45a for carrying the apparatus.

The housing may include a box form base 46 for storage purposes, and provided with a hinged access door 47.

When the replacement of the cobalt pill is necessary it is of course, merely necessary to raise the gate and extend the shaft 6 through the outlet 12, to effect the replacement and permit the long return spring 48 to retrieve the shaft 6.

A lock not illustrated, may be applied at an opening 49 in the plunger 32 to prevent any person without the proper key from operating the apparatus.

It is evident that the vault described above is not only adapted to be used as a receiving vault, it can, if desired, be used also as the vault in which a radio-active substance can be shipped by the Atomic Energy Authority to a purchaser or user of the apparatus.

The use of the relatively long piston rod 6 is necessary by reason of the fact that when the "pill" is in its position of rest alongside of the edge of the gate 14, it would leave an insufficient quantity of lead between the pill and the rear face of the casing block 1. However, the use of lead in the body of this piston rod 6 provides an ample measurement of lead to protect a person standing in line with the piston rod at the rear side of the casing. These features include the width of the gate in front of the rest position of the pill and contribute to safe use of a relative small quantity of lead in the casing block. This, of course, reduces the weight and the amount of freight rates in shipping the apparatus to purchasers who wish to employ it.

Many other embodiments of this invention may be resorted to without departing from the spirit of the invention.

I claim as my invention and desire to secure by Letters Patent:

1. In apparatus for maintaining a radio-active substance harmless to an attendant controlling said apparatus, though ready to perform its radio-active function when required, the combination of a block-form casing composed of screen material of a character to limit the emanation of radio-active rays through the same, said casing having a transverse tunnel passing through the same, a pneumatic cylinder with a piston therein, secured at the rear outer face of said casing with said cylinder surrounding the opening into said tunnel, said piston having a shaft composed of screen material for limiting the emanation of radio-active rays longitudinally through said shaft, said shaft projecting into the adjacent mouth of said tunnel, a radio-active source carried on the inner end of said shaft, a pneumatic connection including a flexible hose for delivering compressed air into the end of said cylinder and back of said piston, for advancing the shaft and the radio-active source from its position of rest within the tunnel, through said tunnel to enable it to project beyond the forward face of said block-form casing, a gate composed of the screen material located movably in said casing and normally blocking said tunnel by lying in the path of radio-active rays emanating from said radio-active source; and means for moving said gate to clear said tunnel and permit it to present an unobstructed path for said radio-active source before the said pneumatic cylinder functions to effect the said advance of the shaft to project the radio-active source from said casing.

2. In apparatus for maintaining a radio-active substance harmless to an attendant controlling said apparatus, the combination of a casing, means for supporting the radio-active substance within the casing, said casing having a wall of ray resistant material of sufficient thickness in any direction from the location of the radio-active substance to sufficiently limit the passage of rays in any direction from its location to the exterior, said casing also having a tunnel with an outlet to the exterior through which rays may pass along a path to the outlet, a gate composed of said ray resistant material normally occupying a portion of said path for preventing passage of rays from said substance to and through said outlet; and pneumatic means, including a perforated pusher mounted in the casing below the edge of the gate for pushing it laterally to the direction in which said path extends, to clear the same and permit the said rays to pass through said outlet; and means operating thereafter for advancing the radio-active substance through the cleared path and the perforation through said outlet so that the rays from the radio-active substance may emanate laterally with respect to the said axis of said path.

3. Apparatus for maintaining a radio-active substance harmless to an attendant controlling said apparatus, according to claim 2, including a shaft composed of material that is resistant to passage of the radio-active rays, and of sufficiently small diameter to pass through the pusher, said pusher including a yoke with an opening therein through which the said shaft passes when advancing the radio-active substance through said outlet; and automatic signal means controlled by the gate for indicating when the gate has been moved sufficiently to clear said path.

4. Apparatus according to claim 3 in which the edge portion of the gate adjacent to the pusher has a transverse notch therein, and the portion of the pusher adjacent to the gate has an extension lying in said notch to maintain the opening in the pusher in its proper plane and at right angles to the axis of the said path for the rays.

5. In apparatus for maintaining a radio-active substance harmless to an attendant controlling said apparatus, though ready to perform its radio-active function when required, the combination of a casing composed of screen material of a character to limit the emanation of radio-active rays through the same, said casing having a rest-chamber within the same for normally containing said radio-active substance, said casing presenting sufficient thickness of said screen material in every direction from said rest-chamber to assure safety of the attendant, means for establishing an unobstructed path from said rest-chamber to the exterior of said casing through which the rays from the radio-active material may pass, a gate assembly having a body composed of said screen material normally obstructing said path, and pusher means for actuating said gate to clear the said path for the passage of the rays through the same, said casing having a flat forward face with an outlet through it disposed in line with the said rest-chamber, said pusher means having a transverse opening adapted to move into line between the said rest-chamber and said outlet to establish the said path to the exterior of the casing, thereby enabling the radio-active substance to be projected through said opening and said outlet and thereby enabling rays from the same to be emanated laterally from the radio-active substance, including electric signals in light circuits with switches closed through the agency of the gate's movements for indicating respectively whether the gate is in its normal position of rest and whether it has moved into position with said transverse opening in line with the said outlet.

6. In apparatus for maintaining a radio-active substance harmless to an attendant controlling said apparatus, though ready to perform its radio-active function when required, the combination of a casing composed of screen material of a character to limit the emanation of radio-active rays through the same, said casing having a rest-chamber within the same for normally containing said radio-active substance, said casing presenting sufficient thickness of said screen material in every direction from said rest-chamber to assure safety of the attendant, means for establishing an unobstructed path from said rest-chamber to the exterior of said casing through which the rays from the radio-active material may pass, a gate assembly having a body composed of said screen material normally obstructing said path, and pusher means for actuating said gate to clear the said path for the passage of the rays through the same, said casing having a flat forward face with an outlet through it disposed in line with the said rest-chamber, said pusher means having a transverse opening adapted to move into line between the said rest-chamber and said outlet to establish the said path to the exterior of the casing, thereby enabling the radio-active substance to be projected through said opening and said outlet and thereby enabling rays from the same to be emanated laterally from the radio-active substance, including a shaft composed of said screen material and carrying the radio-active substance; and a fluid actuated power cylinder with a piston therein for advancing said shaft to pass the radio-active substance through the opening in said gate and far enough beyond the same to place the said substance beyond the outer surface of the casing, thereby enabling the rays from the same to emanate unobstructedly in a plane about at right angles to the axis of said shaft.

7. In apparatus for maintaining a radio-active substance harmless to an attendant controlling said apparatus, though ready to perform its radio-active function when required, the combination of a casing composed of screen material of a character to limit the emanation of radio-active rays through the same, said casing having a rest-chamber within the same for normally containing said radio-active substance, said casing presenting sufficient thickness of said screen material in every direction from said rest-chamber to assure safety of the attendant, means for establishing an unobstructed path from said rest-chamber to the exterior of said casing through which the rays from the radio-active material may pass, a gate assembly having a body composed of said screen material normally obstructing said path, and pusher means for actuating said gate to clear the said path for the passage of the rays through the same, said casing having a flat forward face with an outlet through it disposed in line with the said rest-chamber, said pusher means having a transverse opening adapted to move into line between the said rest-chamber and said outlet to establish the said path to the exterior of the casing, thereby enabling the radio-active substance to be projected through said opening and said outlet and thereby enabling rays from the same to be emanated laterally from the radio-active substance, including automatically actuated signals for indicating respectively whether the gate is in its normal position of rest and whether it has moved into position with its transverse opening in line with the said outlet, and an automatic signal for indicating when the gate assembly has arrived in a position to enable the shaft to pass through the transverse opening in the gate and project the said radio-active substance into the space beyond the outlet, to the exterior of the casing.

References Cited in the file of this patent

UNITED STATES PATENTS

| | | |
|---|---|---|
| 2,551,491 | Gilks | May 1, 1951 |
| 2,670,443 | Pennock et al. | Feb. 23, 1954 |
| 2,684,447 | Gilks | July 20, 1954 |
| 2,719,926 | Proctor et al. | Oct. 4, 1955 |
| 2,772,361 | Hiestand | Nov. 27, 1956 |